Jan. 7, 1958 C. H. HOLM 2,818,858
UNDERWATER BREATHING APPARATUS
Filed March 12, 1954 4 Sheets-Sheet 1

INVENTOR.
CARL H. HOLM

INVENTOR
CARL H. HOLM

Jan. 7, 1958  C. H. HOLM  2,818,858
UNDERWATER BREATHING APPARATUS
Filed March 12, 1954  4 Sheets-Sheet 3

INVENTOR.
CARL H. HOLM

Jan. 7, 1958 C. H. HOLM 2,818,858
UNDERWATER BREATHING APPARATUS
Filed March 12, 1954 4 Sheets-Sheet 4

INVENTOR.
CARL H. HOLM

United States Patent Office 2,818,858
Patented Jan. 7, 1958

1

2,818,858

UNDERWATER BREATHING APPARATUS

Carl H. Holm, Erica, Va., assignor to Old Dominion Research and Development Corporation, Erica, Va., a corporation of Virginia Application March 12, 1954, Serial No. 415,918

10 Claims. (Cl. 128—142)

The present invention relates to improvements in breathing devices and, more particularly, to self-contained underwater breathing apparatus.

Certain dangers and risks of bodily harm in varying degrees are inherently attendant upon the use of underwater breathing apparatus heretofore provided and these are particularly pronounced when inexperienced operators are involved. For example, the operator may be unprepared for the sudden depletion of air and/or he may descend beyond a reasonably safe depth without realization of the limitations of the apparatus and the dangerously increasing water pressures. Such prior devices, particularly when of the self-contained variety, further are objectionable in providing excessive resistance to breathing, inhalation or exhalation or both, and such resistance usually varies according to the position of the operator as when his body is upright in walking, head downwardly as in diving or prone as in swimming.

The general object of the present invention is to provide greatly improved underwater breathing apparatus in which the foregoing and other objections to and disadvantages of prior devices are eliminated or at least controlled to a degree such as to render the apparatus absolutely safe even for inexperienced users such as children after fundamental instruction.

Another general object of the invention is to provide underwater breathing apparatus which affords the least resistance possible to inhalation as well as to exhalation so that the breathing function is substantially normal.

The novel safety features of the present invention involve the provision of an inflatable device such as a collar adapted automatically to be inflated whereby to buoy the user up to the surface when the supply of air or other breathing gas is about to be depleted and/or when he exceeds a predetermined safe depth. The invention further contemplates that such inflation be controlled or otherwise regulated so that the operator is not abruptly jerked to the surface.

The novel breathing features of the invention involve primarily the control of air or other breathing gas by the pressure at the suprasternal notch of the operator. Heretofore, pressure or demand valves which control the air supply to the lungs have been hydrostatically located above the suprasternal notch, at least when the operator assumes certain positions, so that breathing resistance and early fatigue results. My novel concept of positioning the demand valve or the like, or a pressure transmitter for actuating the valve if more convenient to locate the same elsewhere, adjacent the suprasternal notch insures supply of breathing air at exactly the pressure required by the operator's lungs so that inhalation as well as exhalation are without such resistance and are maintained under substantially normal conditions.

A still further general object of the invention is to provide underwater breathing apparatus which, in addition to its features of utmost safety and efficiency, is characterized by its simplicity and low cost of production.

2

Other and further objects and advantages will be apparent from the following detailed explanation taken in conjunction with the accompanying drawings wherein a preferred embodiment of the principles of the invention has been selected for exemplification.

Figure 8:
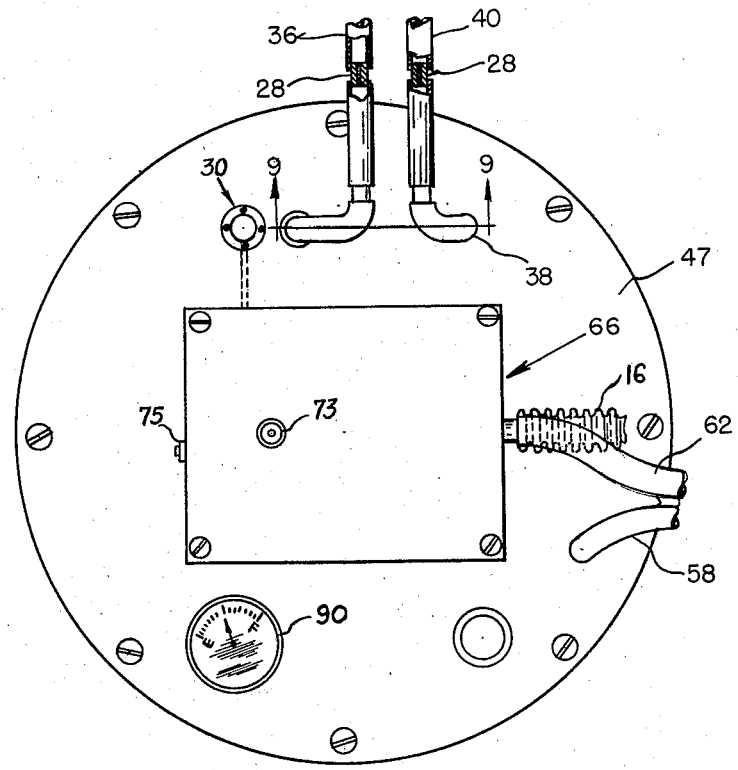
Figure 9:
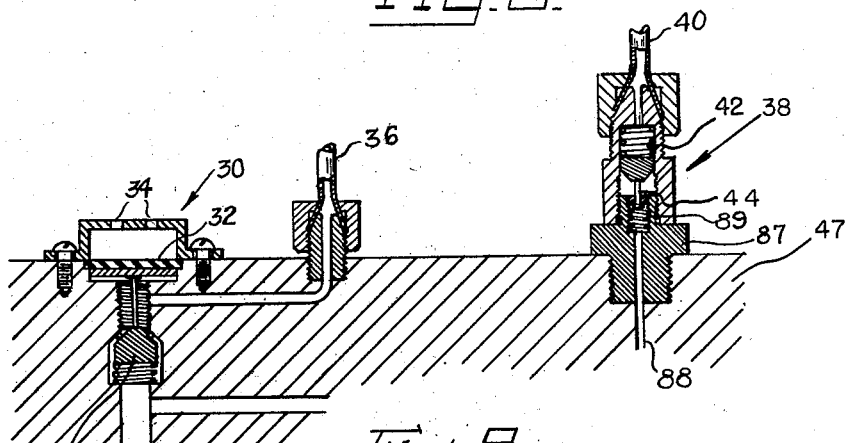

Fig. 8 is an enlarged top plan view of the breathing gas storage tank with the dome removed and showing the demand valve with its tubular connections to the pressure transmitter and mouthpiece as well as the tubular connections to the safety collar in fragment; and Fig. 9 is an enlarged side elevational view partly in section taken on the line 9—9 of Fig. 8 and showing details of the inflatable collar air supply controls.

Referring more in detail to the drawings wherein like numerals refer to like parts, the apparatus illustrated comprises the usual conventional harness consisting of a belt 10 and shoulder straps 12 for supoprting the breathing gas supply tank 14 and cover 15 upon the back of the operator. A flexible breathing gas supply tube 16 extends from the tank 14 preferably over the left shoulder of the operator to a mouthpiece section 18 having a mouthpiece 19 through which such breathing gas in inhaled into the lungs of the operator and exhaled through a one-way flap valve 20. An eye and nose mask 22 to which the mouthpiece 18 is connected is adapted to be strapped securely to the head of the operator or user. The mouthpiece section 18 is preferably in the form of a rigid inverted T and is secured to the mask 22 in such a way that each tends to hold the other snugly to fixed position against the face.

Coming now to the particular features of novelty with which the invention is primarily concerned, a safety device which may take the form of an inflatable collar 24 is carried by the harness so as partially to encircle the neck and to rest upon the shoulders of the operator, as shown. As explained, the collar 24 is adapted to be automatically inflated when the operator exceeds a predetermined depth or when the supply of breathing gas is about to be depleted and, to this end, appropriate controls are provided whereby to release air or other breathing gas from the tank 14 through tubular connections 36 and 40 to the collar 24 which is provided with a spring loaded overpressure valve 29. The connections 36 and 40 are preferably of reduced internal cross-sectional area or are provided with a restricted orifice section such as indicated at 28 to prevent the flow of air from inflating the collar too rapidly and to provide a controlled flow gently to raise the operator to the surface.

For effecting inflation of the collar 24 when the operator exceeds a safe depth or when the water pressure to which the apparatus is subjected exceeds a predetermined maximum, a hydrostatic pressure safety valve member 30 having a flexible diaphragm 32 and open ports 34 to communicate water pressure to the diaphragm controls the flow of breathing gas from its source in the tank to the conduit 36 leading to the collar 24. The arrangement is such that excessive hydrostatic pressure upon the diaphragm 32 will unseat the valve 35 to release breathing gas from the tank 14 to the collar 24.

For effecting inflation of the collar 24 when the supply of breathing gas within the tank 14 becomes dangerously low or is about to be depleted, a depletion safety valve member, such as the spring loaded low pressue valve 38 shown in Fig. 9, is interposed between the source of breathing gas in the tank and the conduit 40 leading to the collar 24. The arrangement is such that when the tank pressure falls to a predetermined value, thus indicating that the supply of breathing gas is about to become exhausted, the load of spring 42 will urge the valve 44 from its seat to release the gas remaining in the tank 14 to the collar 24 and raise the operator to the surface.

The valve members 30 and 38, as shown, may be mounted upon a closure plate 47 having a sealing ring 48 and bolted or otherwise suitably secured to the mouth of the tank 14.

Another particularly important feature of novelty which the invention embraces resides in the hydrostatic pressure or demand valve arrangement which assures unrestricted flow of breathing gas in proper quantity to the lungs at all times. The principle involved is based upon the novel concept of regulating the flow of breathing gas by the hydrostatic pressure prevailing in the region of the operator's suprasternal notch which is substantially the intermediate or central portion of the respiratory system and the body pressure point at which respiratory requirements for the system may be most accurately calculated.

The foregoing novel concept may be most simply implemented by positioning the tank demand valve adjacent the suprasternal notch instead of atop the tank as is usually done or elsewhere on the apparatus remotely from the suprasternal notch. Such an arrangement, however, with presently available types of demand valves, may cause cumbersome bulk and weight at the front neck area of the operator and it has been found that a more practical expedient in most cases is to provide a relatively small and lightweight hydrostatic pressure sensing device in the region of the suprasternal notch and transmitting the pressure from the device to the demand valve which may more conveniently be supported directly upon the tank at the operator's back. Such a pressure sensing device is indicated in its entirety at 46 and may be secured to the apparatus harness by straps 48 so related that when the harness is donned and adjusted the device will rest adjacent to or in the immediate region of the suprasternal notch.

Figure 1:
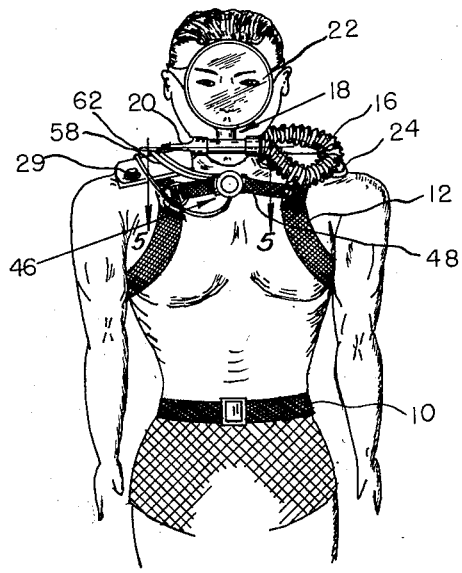
Fig. 1 is a front elevational view showing breathing apparatus constructed and arranged in accordance with the present invention as applied to the user.
Figure 2:
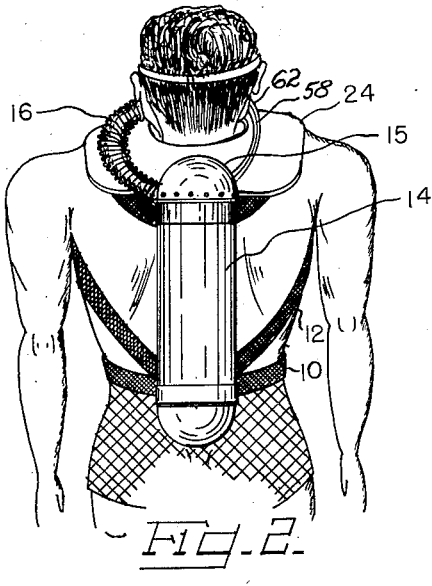
Fig. 2 is a rear elevational view.
Figure 3:
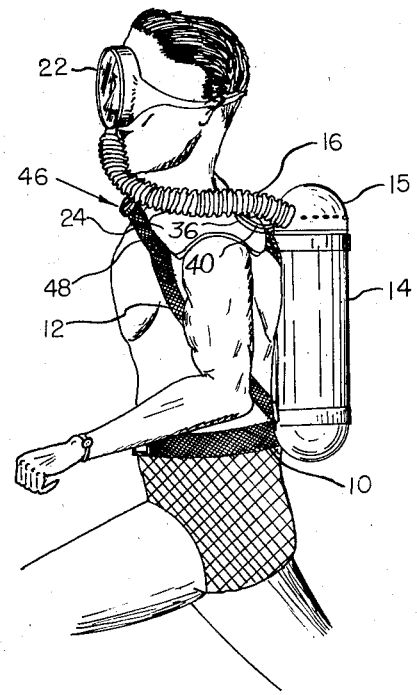
Fig. 3 is a side elevational view.
Figure 4:
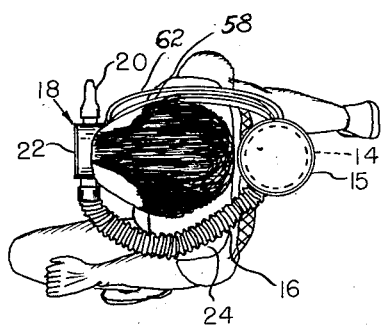
Fig. 4 is a top plan view.
Figure 5:
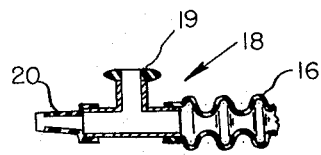
Fig. 5 is a horizontal sectional view taken through the mouthpiece showing the breathing gas inhalation tube in fragment and the exhalation valve.
Figure 6:
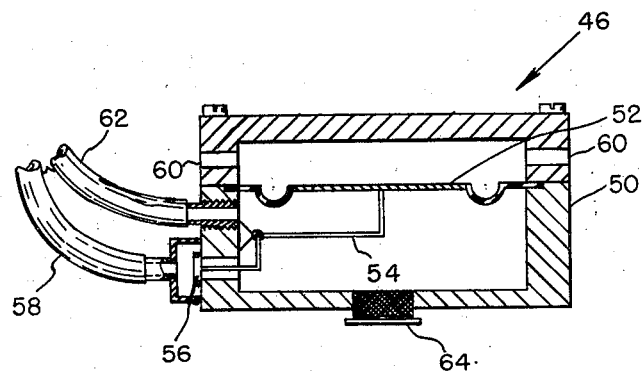
Fig. 6 is an enlarged horizontal sectional view taken through the pressure transmitter device disposed adjacent the suprasternal notch.

The hydrostatic pressure sensing and transmitting valve 46, as best shown in Fig. 6, may simulate in its essentials a conventional demand valve. As shown, a housing or valve body 50 supports a transverse diaphragm 52 which may have a flexible peripheral portion of rubber or the like and a reciprocating metallic central portion which exerts force upon one end of a pivotally supported bell crank lever 54 whose other end actuates an air inlet valve 56 to admit compensating air to the diaphragm chamber from the tank 14 through the conduit 58. Ports 60 are provided in the housing 50 at the opposed side of the diaphragm 52 whereby to subject the diaphragm to hydrostatic pressure which is reflected through the transmitter tube 62 formed preferably of hard rubber or other relatively incompressible material and which leads to the demand valve hereinafter described. The pressure transmitting side of the housing 50 may be provided with a bleeder port opening to the water as indicated at 64.

Figure 7:
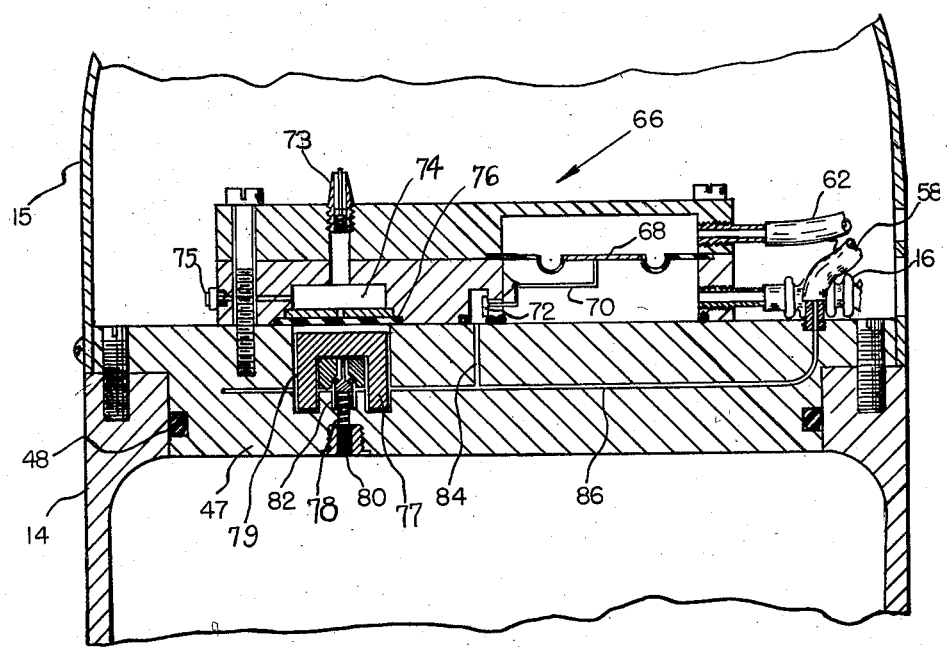
Fig. 7 is an enlarged horizontal sectional view taken through the demand valve and showing the breathing gas storage tank and its dome in fragment.

The demand valve indicated in its entirety at 66 may be mounted upon the closure plate 47 for the tank 14 and is illustrated in detail in Fig. 7. The valve 66 includes the usual diaphragm 68, bell crank lever 70 and inlet valve 72 for admitting breathing gas from the source of supply to the demand valve chamber for discharge through the breathing tube 16. However, the diaphragm 68 instead of being exposed to the hydrostatic pressure adjacent the demand valve 66 in the conventional manner receives its actuating pressure through the tube 62 which transmits pressure from the sensing valve 46 so that the hydrostatic pressure to which the diaphragm 68 is subjected is that prevailing in the region of the suprasternal notch of the operator at the approximate time of inhalation through the breathing tube 16 which thus supplies breathing gas at the exact pressure required.

For transmitting breathing gas from the tank 14 to the respiratory portions of the system, a conventional single stage pressure regulator may be provided in the form of a dome 74 charged with spring air pressure through the valve 73 or a conventional compression spring which actuates the diaphragm 76. When the pressure employed in the dome 74 is in the form of air, an overpressure valve 75 is provided to maintain the pressure at a constant value, say 120 p. s. i. Downward distension of the diaphragm 76 caused by the communicated inhalation of the operator actuates a bell shaped intermediate member 77 which in turn actuates a spring loaded Shraeder valve or the like 78 so that breathing gas may flow from the tank 14 through the filter 80 to the regulated breathing gas storage chamber 79 which surrounds the bell member 77 and thence into the system. Conduits 84 and 86 are provided for transmitting breathing gas under regulated pressure from the storage chamber 79 to the intake valve 72 of the demand valve 66 and to the intake valve 56 of the sensing and transmitting valve 46.

For charging the tank 14, a separate charging valve may be provided or the spring loaded safety valve 38 may be removed from the fitting 87 and charging gas forced through the orifice 88 against the tension of spring 89. A pressure gauge 90 may be provided if desired and also such high pressure relief and high temperature relief valves as safety regulations or other considerations may require. The tank 14 is preferably formed of any aluminum anodized or alodized for protection against oxidation but may, of course, be formed of any other suitable material. The cover plate 47 is preferably removably attached to the tank 14, as shown, to enable cleaning of the tank so as to remove any hazard from this source.

In a specific embodiment of the invention designed particularly for shallow water diving apparatus, the tank 14 may be of 6.5 liter capacity charged to initial pressure of 2200 p. s. i. gage or 150 atmospheres above standard atmosphere. The system may be designed to operate at a depth down to 20 feet at which level the pressure is 8.6 p. s. i. gage above atmospheric or 23.4 p. s. i. absolute or 1.59 atmospheres absolute. For an air consumption of 22.5 liters per minute, referring to air at surface pressure and calculated at an average of the consumption at rest and the consumption for static exercise, about 15 liters and 30 liters per minute, respectively, the tank 14 may initially contain $150 \times 6.5 = 975$ liters of air at free surface conditions or a 46 minute supply. During the time of submersion, the pressure transmitting valve 46 at the suprasternal notch of the user effects free and unrestricted inhalation with a minimum of effort. Should the operator attempt to exceed a safe depth, in this case 20 feet, the hydrostatic pressure safety valve member 30 will become operative or when the supply of air is about to be exhausted, in this case just prior to the expiration of the 46 minute period, the depletion safety valve member 38 will become operative, either valve automatically effecting inflation of the safety collar 24 whereby to raise the operator to the surface. The apparatus, particularly the mouthpiece and exhalation valve, is preferably so constructed and arranged as automatically to cause the necessary exhalation of air by the operator as he rises to the surface.

Although the invention is herein illustrated in connection with open system breathing apparatus it is to be understood that some of the principles thereof are equally adaptable for use with closed systems. Also instead of arranging for the safety valves automatically to inflate a safety collar, either or both valves may be employed to actuate an audible signal to apprise the operator of the conditions prevailing. The principles of the invention are also capable of many other variations, modifications and adaptations all as are encompassed within the scope of the following claims.

In the use of the invention the element upon which the hydrostatic pressure is directly imposed (whether a demand valve itself or the intermediate pressure sensing device 46) is disposed as stated in front of the diver and as close as is reasonably practical to the suprasternal notch of the diver and if the suprasternal notch be looked upon as a point about which the diver pivots as he moves from a head downward or diving position to an upright or to an intermediate, prone position, then it will be clear that this pressure transmitting device will in all of these positions be subjected to the hydrostatic pressure immediately adjacent the said suprasternal notch. If with this arrangement of parts we contrast an arrangement wherein the pressure senser is located upon the chest of the diver and say four inches below the suprasternal notch, we would have a situation in which the hydrostatic pressure imposed upon the sensor would vary from that existent four inches below the suprasternal notch (with the diver upright) to that pressure existing four inches above the suprasternal notch (with the diver head down) or a total difference of eight inches of head. It is clear that such a difference as this would necessarily bring about considerable difference in breathing resistances. Therefore in stating that the pressure senser is located at, or close to, or in the region of, or in proximity to the suprasternal notch it is meant that it is placed sufficiently close to the suprasternal notch to insure that the breathing resistances are substantially the same in all positions of the diver's body.

I claim:

1. Underwater breathing apparatus comprising, an eye and nose mask, a mouthpiece including an exhalation valve secured to said mask, a source of breathable gas, a conduit for conducting gas from said source to said mouthpiece, a pressure operated demand valve in said conduit and positioned adjacent said source for regulating the discharge of gas from said source to said conduit, hydrostatic pressure responsive means, connecting conduits for transmitting operating pressure to said demand valve from the hydrostatic pressure responsive means, means for positioning said hydrostatic pressure responsive means in the region of the suprasternal notch and in front of the body of the user, whereby said demand valve is operable by the hydrostatic pressure prevailing in the region of the suprasternal notch, a safety collar inflatable by restricted flow of gas from said source, an inflating conduit between the source and collar, valve means in said last named conduit responsive to a predetermined hydrostatic pressure to pass inflating gas to said collar, another valve means responsive to a predetermined relatively low gas pressure at said source also to pass inflating gas to said collar, a second inflating conduit between the source and collar in which the last named valve means is located, and a gas recharging valve for said source, the said relatively low pressure responsive valve forming a part of said gas recharging valve.

2. Open circuit underwater breathing apparatus comprising, an eye and nose mask, a mouthpiece including an exhalation valve secured to said mask, a source of breathable gas, a conduit for conducting gas from said source to said mouthpiece, a pressure operated demand valve including in said conduit and positioned adjacent said source for regulating the discharge of gas from said source to said conduit, hydrostatic pressure responsive means, conduits connecting the last named means and the demand valve for transmitting operating pressure to said demand valve from the said means, means for positioning said hydrostatic pressure responsive means in front of and in the region of the suprasternal notch of the user, whereby said demand valve is made operable under control of the hydrostatic pressure prevailing in the region of the suprasternal notch, a safety collar inflatable by restricted flow of gas from said source, valve means responsive to a predetermined relatively low gas pressure at said source to pass inflating gas to said collar, a conduit between the said source and collar in which the said valve means is located and a gas recharging valve for said source, the said relatively low pressure responsive valve forming a part of said gas recharging valve.

3. Underwater breathing apparatus comprising, a mouthpiece, a source of breathable gas, a conduit for conducting gas from said source to said mouthpiece, a pressure operated demand valve in said conduit for regulating the discharge of gas from said source to said conduit, hydrostatic pressure responsive means and connecting conduits for transmitting operating pressure to said demand valve from the hydrostatic pressure responsive means, means for positioning said hydrostatic pressure responsive means in the region of the suprasternal notch of the user and in front of the body of the user, whereby said demand valve is rendered operable by the hydrostatic pressure prevailing in the region of the suprasternal notch throughout all positions of the diver's body, a safety collar inflatable by restricted flow of gas from said source, a conduit between said collar and source, valve means in said conduit responsive to a predetermined hydrostatic presure to pass inflating gas to said collar, a second conduit, and another valve means in the second conduit responsive to a predetermined relatively low gas pressure at said source also to pass inflating gas to said collar.

4. Underwater breathing apparatus comprising, a mouthpiece, an exhalation valve with which said mouthpiece is in communication, a source of breathable gas, a conduit for conducting gas from said source to said mouthpiece, a pressure operated demand valve included in said conduit for regulating the discharge of gas from said source to said conduit, hydrostatic pressure responsive means and a connecting conduit between said means and the demand valve for transmitting operating pressure to said demand valve from the pressure responsive means, means for positioning said hydrostatic pressure responsive means at the suprasternal notch of the user and in front of the body of the user, whereby said demand valve is rendered operable by the hydrostatic pressure prevailing in the region of the suprasternal notch, a safety collar inflatable by restricted flow of gas from said source, a conduit between said collar and source, and valve means in and controlling said conduit, said valve means controlling the passage of inflating gas to said collar, and hydrostatic means acting upon said valve under pressure of the surrounding water to pass inflating gas to the collar upon increase of the hydrostatic pressure to a determined degree.

5. Underwater breathing apparatus comprising, an eye and nose mask, a mouthpiece, a source of breathable gas, a conduit for conducting gas from said source to said mouthpiece, a pressure operated demand valve in said conduit for regulating the discharge of gas from said source to said conduit, hydrostatic pressure responsive means for transmitting operating pressure to said demand valve, a conduit between the last named means and the demand valve through which conduit said operating pressure is delivered, means for positioning said hydrostatic pressure responsive means in the region of the suprasternal notch of the user, whereby said demand valve is made operable by the hydrostatic pressure prevailing in the region of the suprasternal notch, a safety collar inflatable by flow of gas from said source, a conduit between said collar and source, and valve means in said conduit responsive to a predetermined relatively low gas pressure at said source to pass inflating gas to said collar.

6. Open circuit underwater breathing apparatus comprising, a mouthpiece, a source of breathable gas, a conduit for conducting gas from said source to said mouthpiece, a pressure operated demand valve in said conduit for regulating the discharge of gas from said source to said conduit, hydrostatic pressure responsive means, a conduit between said means and the demand valve, for transmitting operating pressure to said demand valve from the hydrostatic pressure responsive means, and means for positioning said hydrostatic pressure responsive means at the suprasternal notch and in front of the body of the user whereby said demand valve is rendered operable under control of the hydrostatic pressure prevailing in the region of the suprasternal notch.

7. In underwater breathing apparatus including a source of breathable gas under pressure; an inflatable safety device and a control valve disposed between the said source and the inflatable device, said valve being automatically responsive to a predetermined relatively low gas pressure at said source for inflating said device with gas from said source upon a determined depletion of said source of gas.

8. In underwater breathing apparatus including a source of breathable gas under pressure; an inflatable safety device, a conduit connecting the source and the device, means in said conduit responsive to a predetermined hydrostatic pressure for automatically inflating said device from said source when the user exceeds a predetermined depth a second conduit conducting pressure gas from the source to the inflatable device and valvular means in the second conduit responsive to a predetermined relatively low gas pressure at said source for automatically inflating said device with gas from said source upon a determined depletion of said source of gas.

9. In underwater breathing apparatus, a body engaging harness, a mouthpiece, a breathing gas tank and a demand valve supported by said harness at the rear of the user's body, a conduit between the tank and mouthpiece controlled by the demand valve, and a pressure sensing device actuated by hydrostatic pressure and controlling said demand valve, said pressure sensing device being supported by said harness in front of the user's body and substantially at the suprasternal notch of the user.

10. In underwater breathing apparatus, a body engaging harness, breathing gas tank and a demand valve supported by said harness at the rear of and from the shoulders of the user, a hydrostatically activated pressure sensing device smaller than the demand valve and controlling the action of the demand valve, said pressure sensing device being supported by said harness and being positioned by said harness to lie in front of the body of the user and substantially at the suprasternal notch of the user.

References Cited in the file of this patent

UNITED STATES PATENTS

| | | |
|---|---|---|
| 996,135 | Poe | June 27, 1911 |
| 2,303,155 | Berge | Nov. 24, 1942 |
| 2,362,643 | Lambertsen | Nov. 14, 1944 |
| 2,456,130 | Lambertsen | Dec. 14, 1948 |
| 2,485,039 | Cousteau et al. | Oct. 18, 1949 |

FOREIGN PATENTS

| | | |
|---|---|---|
| 129,382 | Australia | Oct. 11, 1948 |
| 782,331 | France | Mar. 11, 1935 |